United States Patent
Demers et al.

(10) Patent No.: US 7,990,917 B2
(45) Date of Patent: *Aug. 2, 2011

(54) WIRELESS COMMUNICATIONS SYSTEM INCLUDING AN ORIGINATOR BASE STATION CAPABLE OF NOTIFYING OF CHANNEL RESOURCE RESERVATION STATUS

(75) Inventors: John K. Demers, Encinitas, CA (US); Mark Alan Schmitt, Charles Town, WV (US)

(73) Assignee: Nextel Communications Inc., Reston, VA (US)

( * ) Notice: Subject to any disclaimer, the term of this patent is extended or adjusted under 35 U.S.C. 154(b) by 919 days.

This patent is subject to a terminal disclaimer.

(21) Appl. No.: 10/893,451

(22) Filed: Jul. 16, 2004

(65) Prior Publication Data
US 2005/0286545 A1    Dec. 29, 2005

Related U.S. Application Data

(60) Provisional application No. 60/579,440, filed on Jun. 14, 2004.

(51) Int. Cl.
*H04W 4/00* (2009.01)
(52) U.S. Cl. ........ 370/329; 370/341; 370/328; 455/13.2
(58) Field of Classification Search .................. 370/468, 370/310–350; 455/13.1, 13.2
See application file for complete search history.

(56) References Cited

U.S. PATENT DOCUMENTS

| | | | | |
|---|---|---|---|---|
| 5,826,169 A * | 10/1998 | Natarajan | ..................... | 455/13.1 |
| 6,219,525 B1 * | 4/2001 | Imai et al. | .................... | 455/3.05 |
| 6,321,093 B1 | 11/2001 | Dalal | | |
| 6,975,606 B2 * | 12/2005 | Korinek et al. | ............... | 370/331 |
| 6,996,374 B1 | 2/2006 | Bao et al. | .................... | 455/67.11 |
| 7,130,287 B2 * | 10/2006 | Nounin et al. | ................ | 370/332 |
| 2001/0038615 A1 | 11/2001 | Chang | | |
| 2002/0131387 A1 | 9/2002 | Pitcher et al. | | |
| 2002/0191635 A1 * | 12/2002 | Chow et al. | ................... | 370/463 |
| 2003/0053612 A1 | 3/2003 | Henrikson et al. | | |
| 2004/0057412 A1 * | 3/2004 | Curcio et al. | ................. | 370/341 |
| 2004/0233870 A1 | 11/2004 | Willenegger et al. | | |
| 2005/0259610 A1 * | 11/2005 | Demers et al. | ................ | 370/328 |
| 2007/0206542 A1 | 9/2007 | Proctor, Jr. | | |

OTHER PUBLICATIONS

International Preliminary Report on Patentability and Written Opinion for PCT/US2005/020920 dated Dec. 14, 2006.
Office Action dated Jan. 2, 2008 in pending U.S. Appl. No. 10/893,450.

* cited by examiner

*Primary Examiner* — Nghi Ly
*Assistant Examiner* — Amancio Gonzalez

(57) ABSTRACT

A wireless communications system including a network application server; and a base station to receive an expedited request packet from a subscriber unit by way of a radio frequency interface, attempt to reserve channel resources for a traffic channel to communicate with the subscriber unit, and notify the network application server of whether the channel resources have been reserved. The base station may notify the network application server by marking the expedited request packet received from the subscriber unit, and sending the marked expedited request packet to the network application server.

14 Claims, 7 Drawing Sheets

US 7,990,917 B2

WIRELESS COMMUNICATIONS SYSTEM INCLUDING AN ORIGINATOR BASE STATION CAPABLE OF NOTIFYING OF CHANNEL RESOURCE RESERVATION STATUS

CROSS REFERENCE TO RELATED APPLICATION

This application claims the benefit of the filing date of Provisional Patent Application Ser. No. 60/579,440, filed on Jun. 14, 2004, entitled "Wireless Communications System Including an Originator's Base Station Capable of Notifying Channel Resource Reservation Status," which is incorporated herein by reference.

FIELD OF THE INVENTION

This invention relates generally to wireless communications systems, and in particular, to a wireless communications system including an originator's base station capable of notifying a network application server as to the status of the reservation of channel resources.

BACKGROUND OF THE INVENTION

A typical wireless communications system includes a network application server, a plurality of base stations communicatively coupled to the network application server, and a plurality of subscriber units (SUs) that communicate with the network application server by way of the base stations. Generally, when the network application server needs to communicate with the SU, or vice-versa, the SU and the base station currently serving the SU establish a traffic channel through which communications are sent between the network application server and the SU. The process of establishing such a traffic channel, however, is more involved as discussed below.

Generally, an SU will from time-to-time enter into a "dormant mode," i.e. a low power mode to conserve its internal-battery life. When not in the "dormant mode," an SU maintains one or more traffic channels with the base station even if the subscriber is not using the device. In the "dormant mode," however, an SU does not maintain any traffic channels with the base station. Instead, the SU only responds to subscriber initiated actions and periodically monitors the paging channel to determine whether it has been paged.

Typically, when a "dormant" SU needs to communicate with the network application server in response to a subscriber initiated action, the "dormant" SU sends an expedited request packet to the base station currently serving the "dormant" SU. An example of such an expedited request packet is a request to communicate with a target SU. The request packet is expedited because it is transmitted using a common channel since a "dormant" SU does not maintain any traffic channel with the base station. The common channel is a data communication path shared by all SUs currently listening to the base station.

In response to receiving the expedited request packet, the base station attempts to reserve channel resources for a traffic channel to be used by the network application server to communicate with the SU. Additionally, the base station forwards the request packet to the network application server for processing the request.

Once the network application server receives the request packet, it automatically assumes that channel resources for a traffic channel between the base station and the originating SU have been reserved. The network application server then operates as if such channel resources have been reserved, and allows communications to be sent to the base station for transmission to the originating SU by way of the assumed traffic channel.

However, there may be situations when the originator's base station has yet to reserve channel resources for a traffic channel when the network application server receives the request packet. This may be because there are no available traffic channels at such time since they are being used by other subscribers. In such a case, the network application server operates as if such traffic channel has been reserved, and begins allowing communications to be sent to the base station for subsequent transmission to the originating SU. This may lead to a waste of resources since the network application server is performing operations under the assumption that a traffic channel exists, when in fact it does not. And consequently, such operations performed by the network application server may result in the request not being met.

SUMMARY OF THE INVENTION

An aspect of the invention relates to a wireless communications system including a network application server; and a base station to receive an expedited request packet from a subscriber unit (SU), attempt to reserve channel resources for a traffic channel to communicate with the SU, and notify the network application server of whether the channel resources have been reserved. An exemplary method of notifying the network application server of whether channel resources have been reserved includes the base station marking the received expedited request packet to indicate whether channel resources have been reserved, and sending the marked packet to the network application server. The term "channel resources" as defined herein means any resource used to support the requested traffic channel including, but not limited to, network bandwidth, radio frequency (RF) bandwidth, Walsh codes, time slots, forward power resources, internal base station capacity parameters, etc.

Another aspect of the invention relates to a base station comprising a network interface; a radio frequency (RF) interface; and a processor to receive an expedited request packet from an SU by way of the RF interface, attempt to reserve channel resources for a traffic channel to communicate with the SU, and notify the network application server of whether the channel resources have been reserved. The base station may notify the network application server by marking the received expedited request packet, and sending the marked packet to the network application server. Also disclosed are a method and computer readable medium including one or more software modules related to the operations of the base station.

Yet another aspect of the invention relates to a network application server comprising a network interface; and a processor to receive a marked request packet from a base station by way of the network interface, wherein the marked request packet indicates whether channel resources for a traffic channel to communicate with an SU have been reserved. The processor also performs a first operation if the marked request packet indicates that such channel resources have been reserved, or performs a second operation if the marked request packet indicates that such channel resources have not been reserved. Also disclosed are a method and computer readable medium including one or more software modules related to the operations of the network application server.

Still another aspect of the invention relates to a subscriber unit comprising an RF interface; and a processor to transmit a request to a base station by way of the RF interface via a common channel, and receive a notification by way of the RF interface via the common channel, wherein the notification indicates that channel resources for a traffic channel for the subscriber unit to communicate with the base station could not be reserved. Also disclosed are a method and a computer readable medium storing one or more software modules related to the operations of the subscriber unit.

Other aspects, features, and techniques of the invention will be apparent to one skilled in the relevant art in view of the following detailed description of the invention.

DETAILED DESCRIPTION OF THE EXEMPLARY EMBODIMENTS

Figure 1:
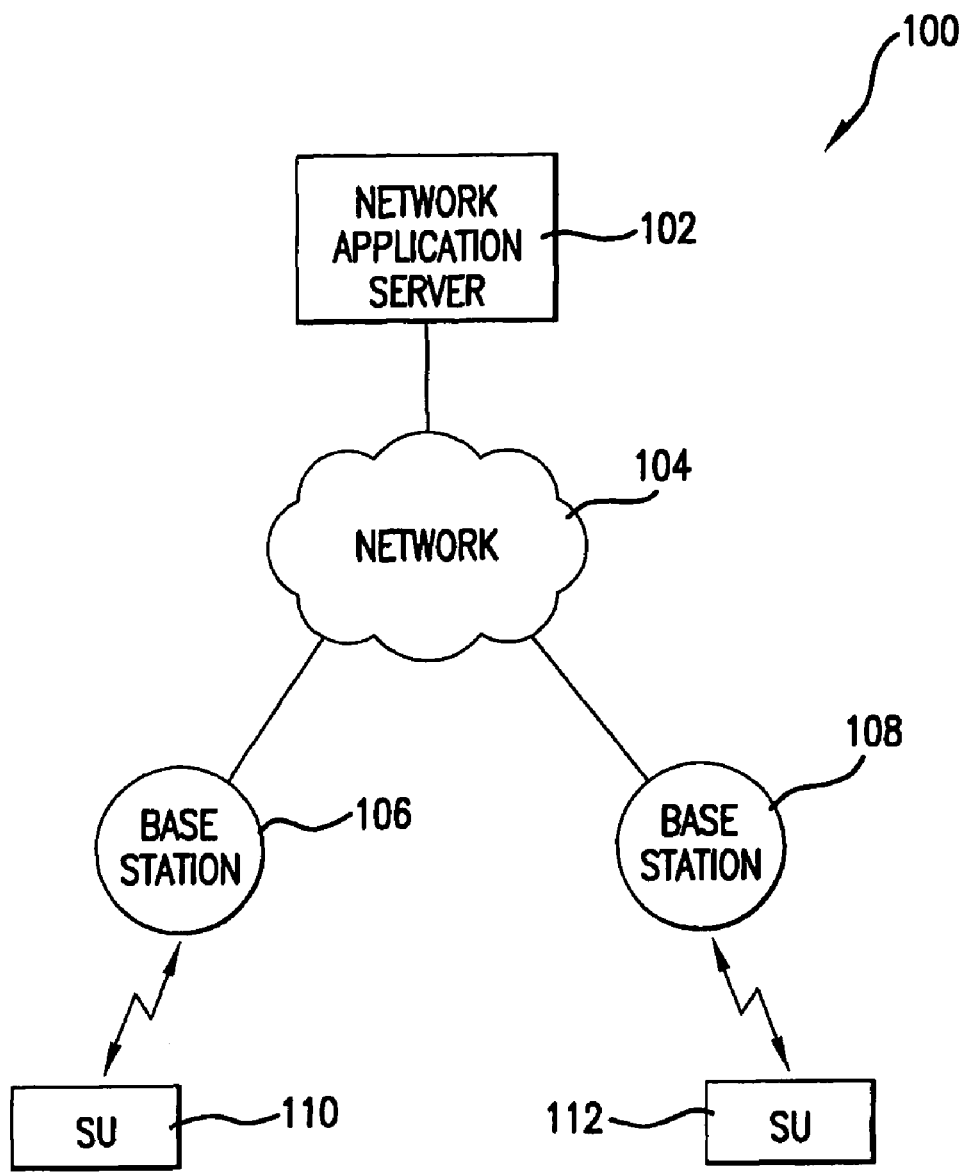
FIG. 1 illustrates a block diagram of an exemplary wireless communications system in accordance with an embodiment of the invention.

FIG. 1 illustrates a block diagram of an exemplary wireless communications system 100 in accordance with an embodiment of the invention. The wireless communications system 100 comprises a network application server 102, a network 104, and a plurality of base stations 106 and 108 (two of which are shown). The wireless communications system 100 serve a plurality of subscriber units (SUs) 110 and 112. As later discussed in more detail, the base stations 106 and 108 are configured to mark an expedited request packet received from an SU to indicate whether channel resources have been reserved for the purpose of sending communications to the SU. The base stations send the marked packet to the network application server 102. The term "communications" as used herein include voice, data, control signals, and other information.

The network application server 102 handles requests to setup communication channels between a plurality of communicating devices such as SUs, data servers, other application servers, etc. For example, the network application server 102 may be a dispatch call processing unit to setup communications channels to facilitate dispatch (walkie-talkie type) communications between a plurality of communicating devices. Alternatively, or in addition to, the network application server 102 may be an instant message processing unit to setup communications channels to facilitate instant message communications between a plurality of communicating devices. Alternatively, or in addition to, the network application server 102 may be a database processing unit to setup communications channels to facilitate database communications between a plurality of communicating devices. Alternatively, or in addition to, the network application server 102 may be a global positioning satellite (GPS) processing unit to setup communications channels to facilitate location information communications between a plurality of communicating devices. The network application server 102 may be capable of handling other types of communication applications.

The network 104 serves to facilitate communications between the network application server 102 and the base stations 106 and 108. The network 104 may be of any suitable types, including without limitations, Internet Protocol (IP), asynchronous transfer mode (ATM), and frame relay.

The base stations 106 and 108 provide a wireless (i.e., radio frequency (RF)) interface between the SUs 110 and 112 and the network 104. The base station 106 and 108 may use any suitable RF protocol for communicating with the SUs 106 and 108. For example, suitable RF protocols include code division multiple access (CDMA), wideband CDMA (WCDMA), frequency division multiplexing (FDM), orthogonal FDM (OFDM), time division multiple access (TDMA), or any combination thereof.

The SUs 110 and 112 may be any mobile and/or stationary device that subscribers use to communicate with the wireless communications system 100. For example, subscriber units 110 and 112 may include handsets, laptop computers, personal digital assistants (PDAs), desktop computers, global positioning satellite (GPS) devices, game devices, etc.

As the various elements of the wireless communications system 100 have been addressed, the following describes an exemplary method, implemented by a base station, to notify the network application server as to the status of the reservation of channel resources. In this example, the SU 110, which is in a "dormant mode," intends to make a dispatch call to SU 112.

Figure 2:
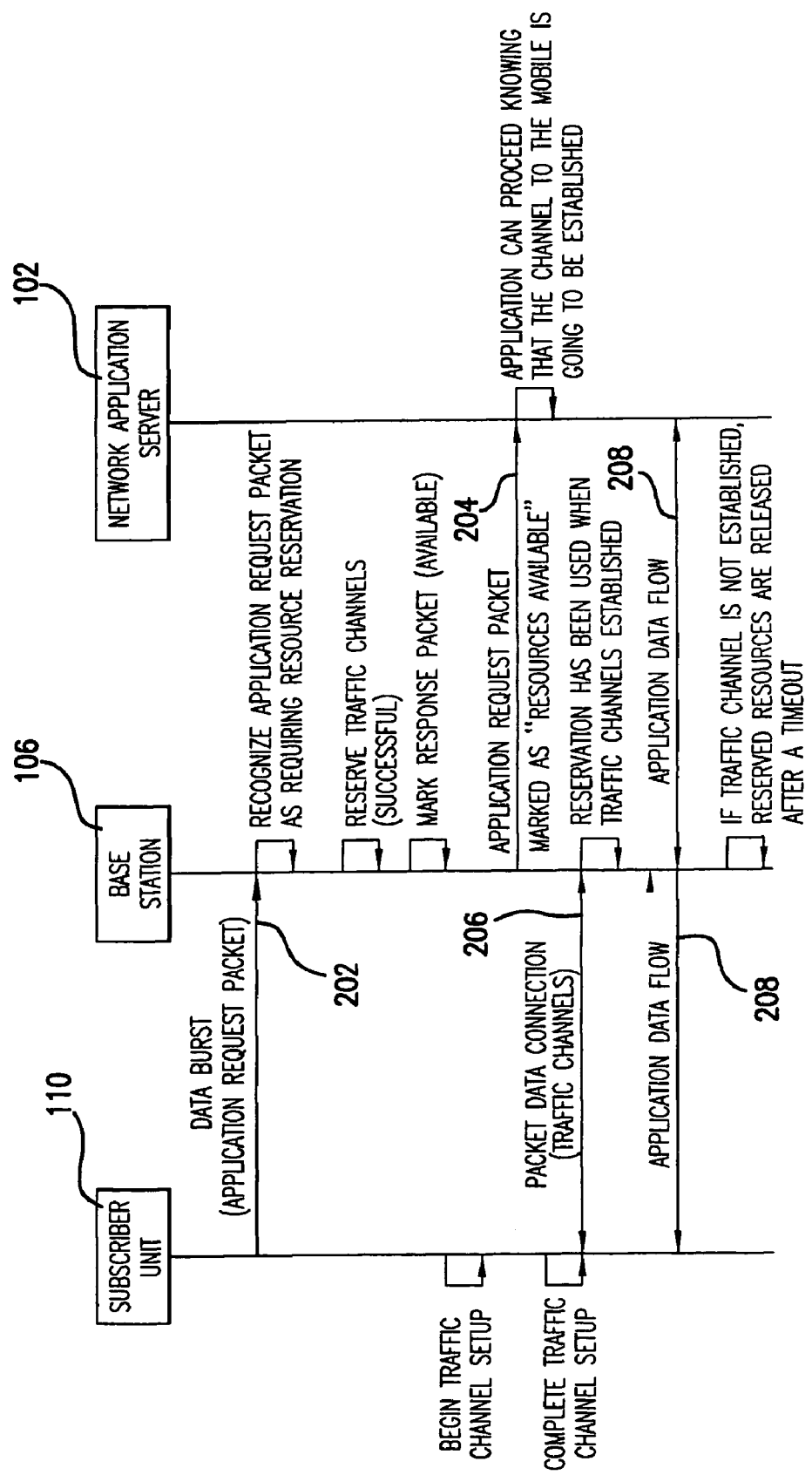
FIG. 2 illustrates a signal flow diagram illustrating exemplary signals generated in the exemplary wireless communications system in a channel resource reservation success scenario in accordance with another embodiment of the invention.

With reference to both FIGS. 1-2, in which the latter illustrates a signal diagram associated with the exemplary method of notifying a network application server as to the success of the base station in reserving channel resources, the "dormant" SU 110 sends a data burst including an application request packet 202 to the base station 106 using the common channel. The request packet 202 may be, for example, a dispatch call request targeting SU 112.

In response to receiving the request packet 202, the base station 106 recognizes that the request packet requires a reservation of channel resources for a traffic channel to communicate with SU 110. Accordingly, at such time the base station 106 attempts to reserve channel resources for the traffic channel. In this example, the base station 106 is successful in reserving channel resources for the traffic channel. The base station 106 then marks the request packet to indicate that channel resources are available, and then sends the marked request packet 204 to the network application server 102 by way of the network 104.

As a result of receiving the marked request packet 204, the network application server 102 knows that a traffic channel exists to communicate with the originating SU 110, and operates accordingly to serve the request. In this situation, there are no wasted resources since a traffic channel exists to communicate with SU 110 and the network application server 102 operates accordingly. Subsequently, the base station 106 and SU 110 send each other handshaking messages 206 to establish a traffic channel. And, application data 208 is communicated between the network application server 102 and the SU 110 by way of the base station 106 using the established traffic channel. If traffic channel is not established within a predetermined time after channel resources have been reserved, the base station 106 releases the channel resources.

This example illustrates the case where the base station 106 has successfully reserved channel resources for a traffic channel. The following example illustrates the case where the base station is not successful in reserving channel resources for a traffic channel.

Figure 3:
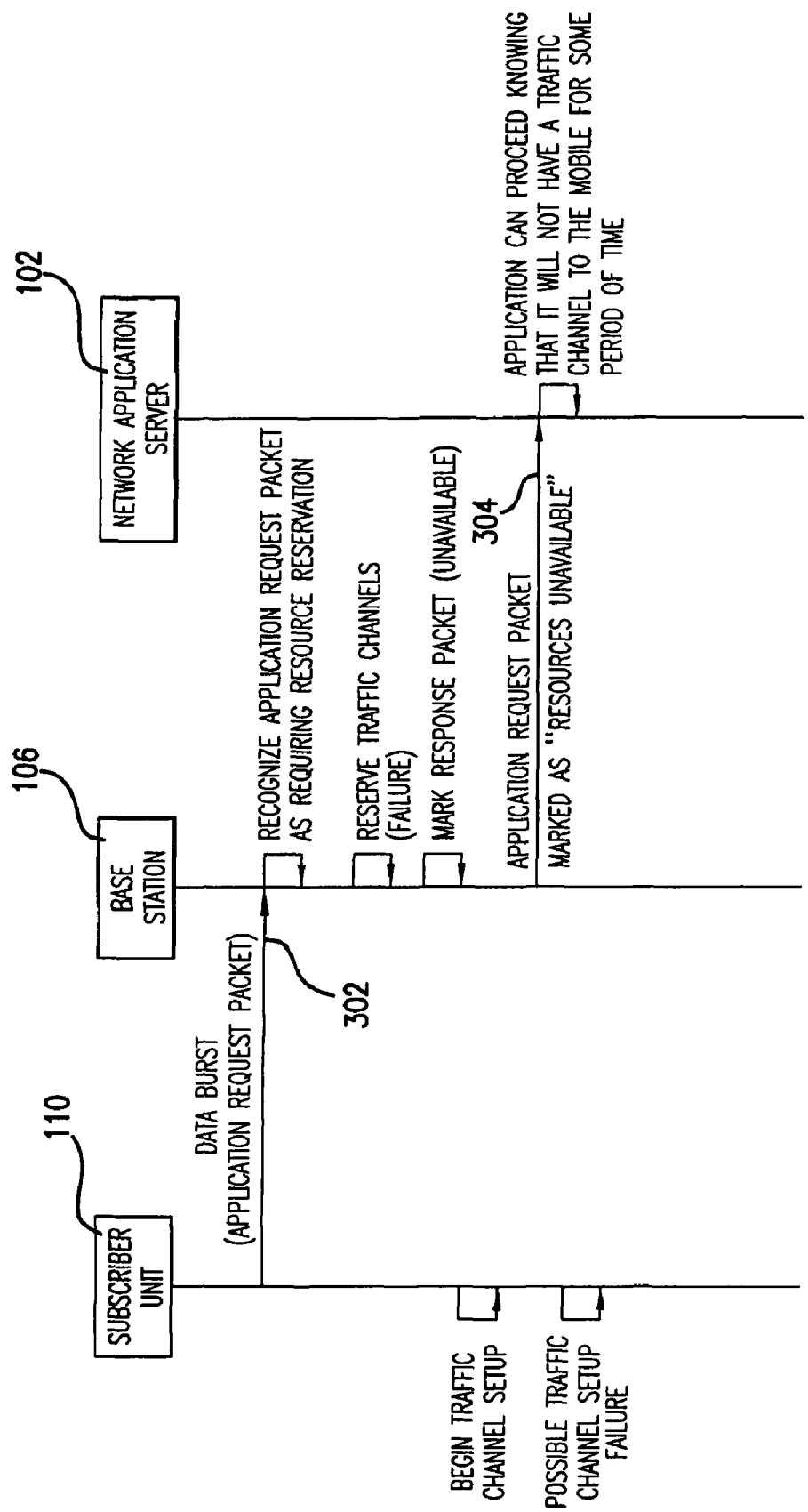
FIG. 3 illustrates a signal flow diagram illustrating exemplary signals generated in the exemplary wireless communications system in a channel resource reservation failure scenario in accordance with another embodiment of the invention.

With reference to both FIGS. 1 and 3, in which the latter illustrates a signal diagram associated with the exemplary method of notifying a network application server as to the failure of the base station 106 to reserve channel resources for a traffic channel, the "dormant" SU sends a data burst including an application request packet 302 to the base station 106 using the common channel. As discussed above, the request packet 302 may be, for example, a dispatch call request targeting SU 112.

In response to receiving the request packet 302, the base station 106 recognizes that the request packet requires a reservation of channel resources for a traffic channel to communicate with SU 110. Accordingly, at such time the base station 106 attempts to reserve channel resources for the traffic channel. In this example, the base station 106 is not successful in reserving channel resources for the traffic channel. The base station 106 then marks the request packet to indicate that channel resources are not available, and then sends the marked request packet 304 to the network application server 102 by way of the network 104.

As a result of receiving the marked request packet 304, the network application server 102 knows that a traffic channel does not exists to communicate with the originating SU 110, and operates accordingly. In this situation, there are no wasted resources since a traffic channel does not exists to communicate with SU 110 and the network application server 102 operates accordingly.

An advantage of the wireless communications system 100 and associated method of notifying a network application server of the status of channel resource reservation is that a waste of resources may be prevented or reduced. As discussed in the Background section, a waste of resources occurs when the network application server operates as if channel resources are available for a traffic channel between a base station and an SU, when in fact it does not.

Figure 4A:
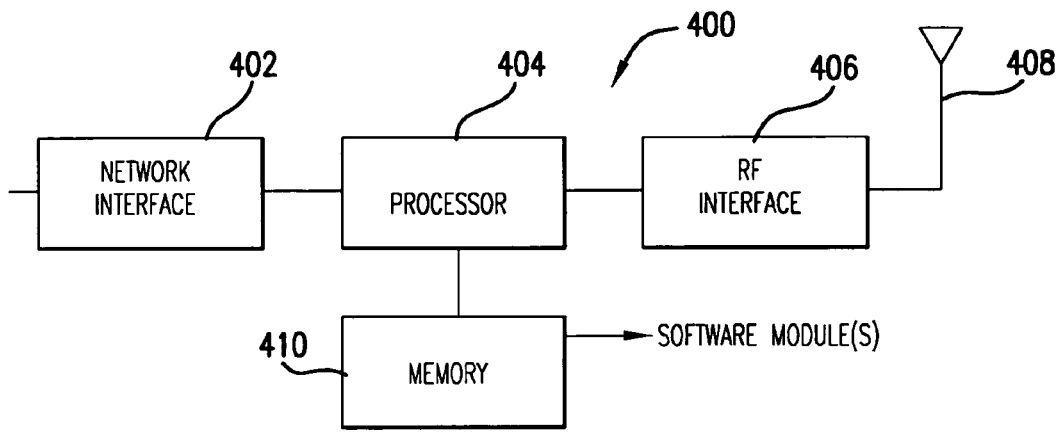
FIG. 4A illustrates a block diagram of an exemplary base station in accordance with another embodiment of the invention.

FIG. 4A illustrates a block diagram of an exemplary base station 400 in accordance with another embodiment of the invention. The base station 400 is an exemplary detailed version of the base stations 106 and 108 of the wireless communications system 100. In particular, the base station 400 comprises a network interface 402, a processor 404, an RF interface 406, an antenna 408, and a memory 410.

The network interface 402 provides the base station 400 an interface to the network 104 to receive communications from and send communications to the network application server 102 and other network devices. The processor 404 performs the various operations of the base station 400 as discussed with reference to FIG. 4B. The RF interface 406 including the antenna 408 provide the base station 400 an interface to the wireless medium to receive communications from and send communications to SUs, such as SU 110. The memory 410, serving generally as a computer readable medium, stores one or more software modules that control the processor 404 in performing its various operations. The operations implemented by the base station 400 are discussed as follows.

Figure 4B:
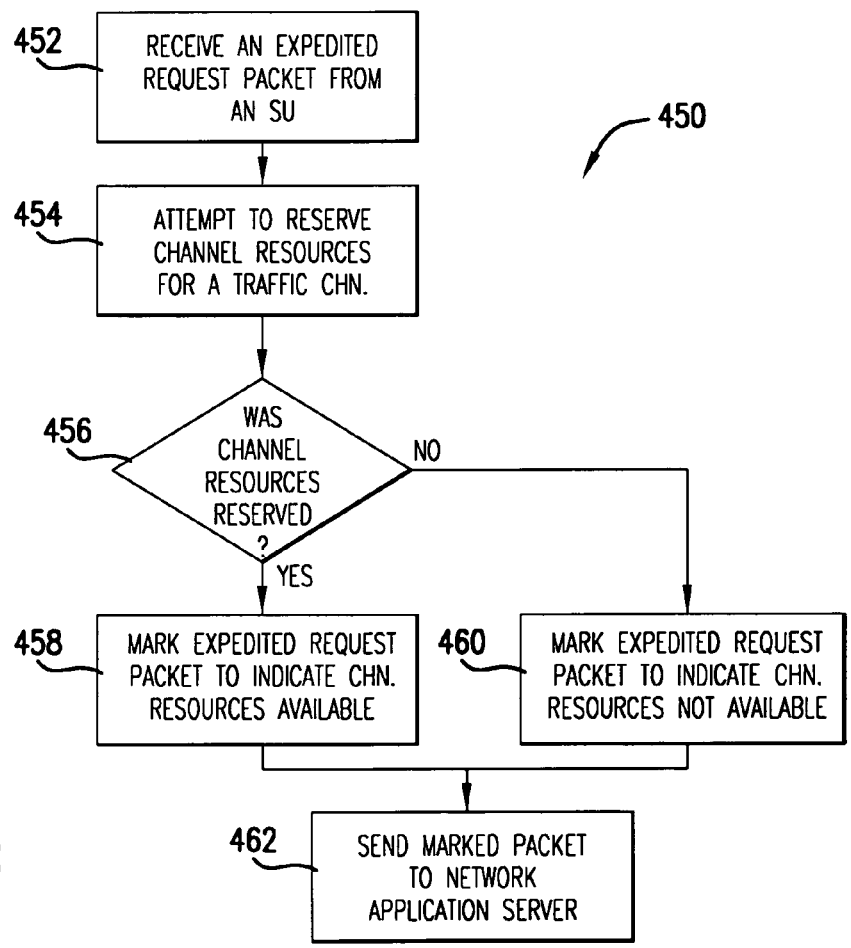
FIG. 4B illustrates a flow diagram of an exemplary method implemented by the exemplary base station in accordance with another embodiment of the invention.

FIG. 4B illustrates a flow diagram of an exemplary method 450 implemented by the exemplary base station 400 in accordance with another embodiment of the invention. The method 450 begins with the processor 404 receiving an expedited request packet from an SU by way of the RF interface 406 and antenna 408 (block 452). In response to receiving the expedited request packet, the processor 404 attempts to reserve channel resources for a traffic channel to communicate with the SU block 454). Next, the processor 404 determines whether channel resources for a traffic channel have been reserved (block 456).

If the processor 404 determines that channel resources for a traffic channel have been reserved, the processor 404 then marks the expedited request packet to indicate that channel resources for a traffic channel have been reserved (block 458). On the other hand, if the processor 404 determines that channel resources for a traffic channel have not been reserved, the processor 404 marks the expedited request packet to indicate that channel resources for a traffic channel have not been reserved (block 460). Once the processor 404 has marked the expedited request packet as per either block 458 or block 460, the processor 404 sends the marked packet to the network application server by way of the network interface 402 (block 462).

Figure 5A:
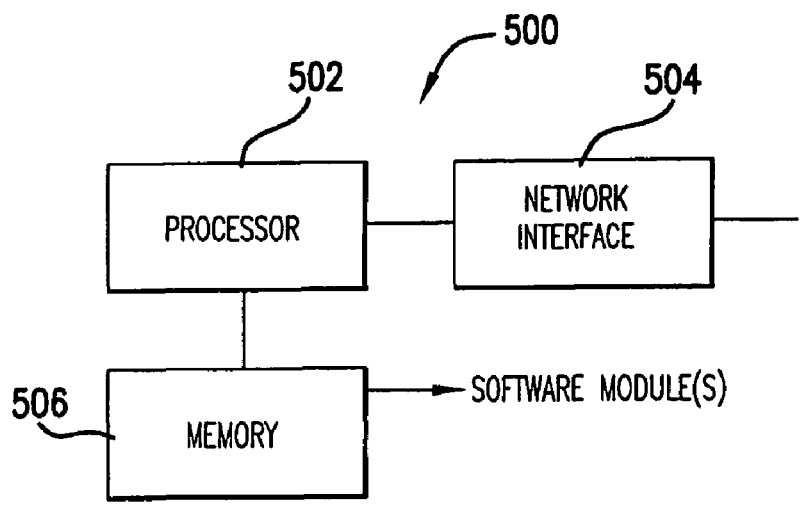
FIG. 5A illustrates a block diagram of an exemplary network application server in accordance with an embodiment of the invention.

FIG. 5A illustrates a block diagram of an exemplary network application server 500 in accordance with an embodiment of the invention. The network application server 500 is an exemplary detailed version of the network application server 102 of the wireless communications system 100. In particular, the network application server 500 comprises a processor 502, a network interface 504, and a memory 506.

The processor 502 performs the various operations of the network application server 500 as discussed below with reference to FIG. 5B. The network interface 504 provides the network application server 500 an interface to the network 104 to receive communications from and send communications to base stations, SUs, and other network devices. The memory 506, serving generally as a computer readable medium, stores one or more software modules that control the processor 502 in performing its various operations. The operations implemented by the network application server 500 are discussed as follows.

Figure 5B:
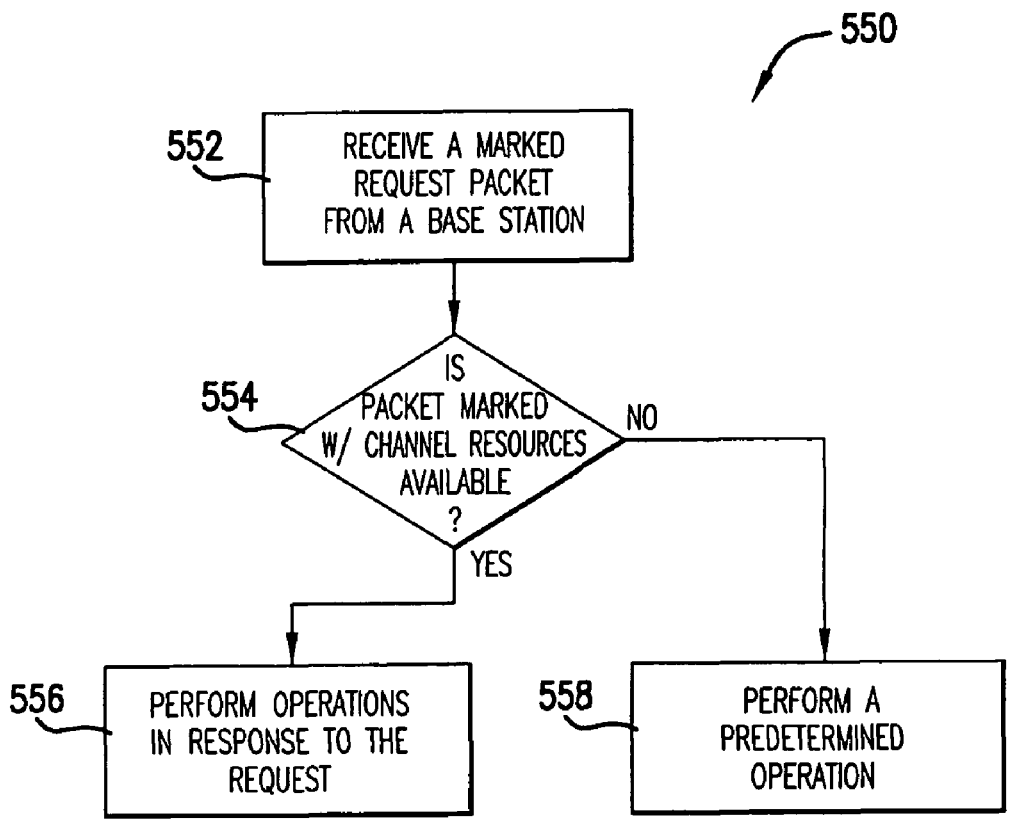
FIG. 5B illustrates a flow diagram of an exemplary method implemented by the exemplary network application server in accordance with another embodiment of the invention.

FIG. 5B illustrates a flow diagram of an exemplary method 550 implemented by the exemplary network application server 500 in accordance with another embodiment of the invention. The method 550 begins by the processor 502 receiving a marked request packet from a base station by way of the network interface 504 (block 552). The processor 502 then determines whether the request packet is marked to indicate that channel resources for a traffic channel have been reserved (block 554). If it is so marked, the processor 502 performs operations in response to the received request (block 556). Otherwise, the processor 404 performs another predetermined operation, such as notify the originating SU that the request cannot be serviced at such time (block 558). The notification may indicate that the call cannot be completed because channel resources could not be reserved.

Figure 6:
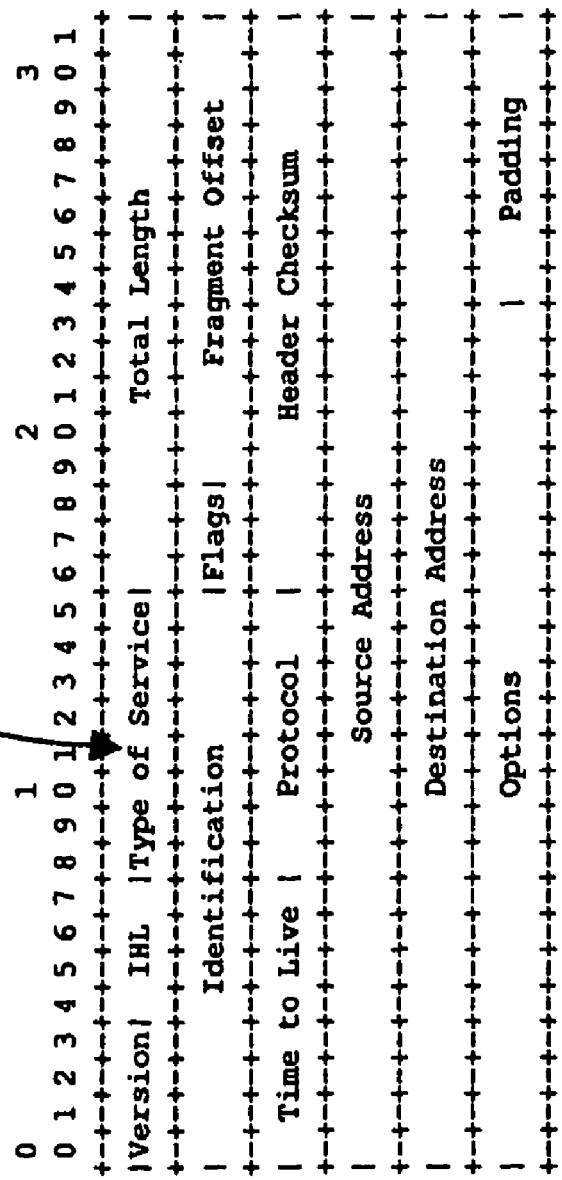
FIG. 6 illustrates a diagram of an exemplary packet header in accordance with another embodiment of the invention.

FIG. 6 illustrates a diagram of an exemplary packet header 600 in accordance with another embodiment of the invention. This packet header 600 is used herein to exemplify one way of marking a packet to inform the network application server as to whether the originator base station was able to reserve channel resources for a traffic channel to communicate with the originator SU. The packet header 600 is of the type used in Internet Protocol (IP) version 4. It shall be understood that other protocols and different versions of IP may be used.

The packet header 600 comprises various fields such as the version, IP header link (IHL), Type of Service (TOS), Total Length, Identification, Flags, Fragment Offset, Time to Live, Protocol, Header Checksum, Source Address, Destination Address, Options, and Padding. One way to mark the packet header 600 is to mark one or more bits in the TOS field to indicate whether the originator base station was able to reserve channel resources for a traffic channel to communicate with the originator SU. It shall be understood that other fields of the packet header 600 may be marked to indicate the same.

Figure 7A:
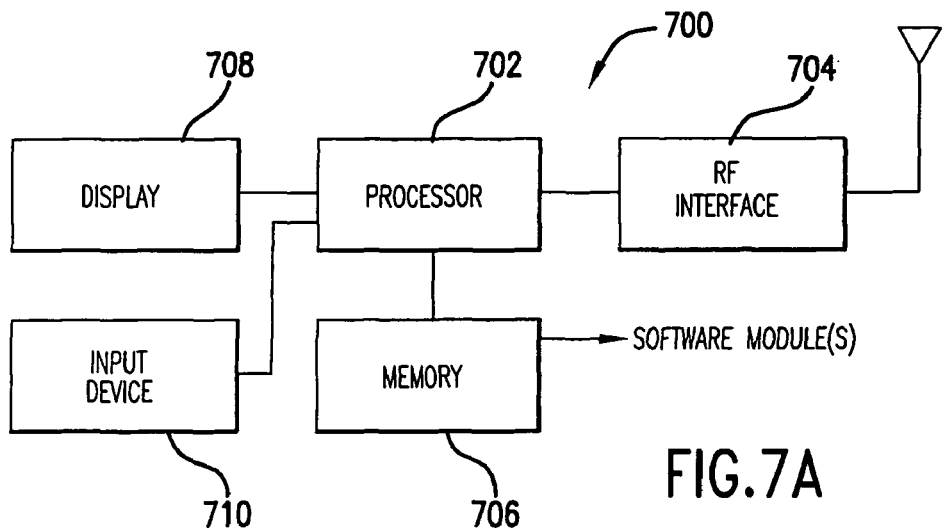
FIG. 7A illustrates a block diagram of an exemplary subscriber unit in accordance with another embodiment of the invention.

FIG. 7A illustrates a block diagram of an exemplary subscriber unit 700 in accordance with another embodiment of the invention. The subscriber unit 700 comprises a processor 702, an RF interface 704 including an antenna, a memory 706, a display 708, and an input device 710. The processor 702 performs the various operations of the subscriber unit 700 as discussed below with reference to FIG. 7B. In particular, the processor 702 sends an expedited request to the corresponding base station, assists in setting up a traffic channel if an acceptance response to request is received, and notifies the user or performs other operations if a notice is received that channel resources for the request cannot be reserved.

The RF interface 704 including the antenna provide an interface to the wireless medium for receiving communication from and sending communication to a wireless communication system by way of base stations. The display 708 provides a user with visual information. The input device 710 provides a user a manner to provide information to the subscriber unit 100. It shall be understood that the display 708 and input device 710 may be an integrated component, such as, for example, a touch-sensitive display screen. The memory 706, serving generally as a computer readable medium, stores one or more software modules for controlling the operations of the processor 702. The following provides a discussion of various operations performed by the subscriber unit 700.

Figure 7B:
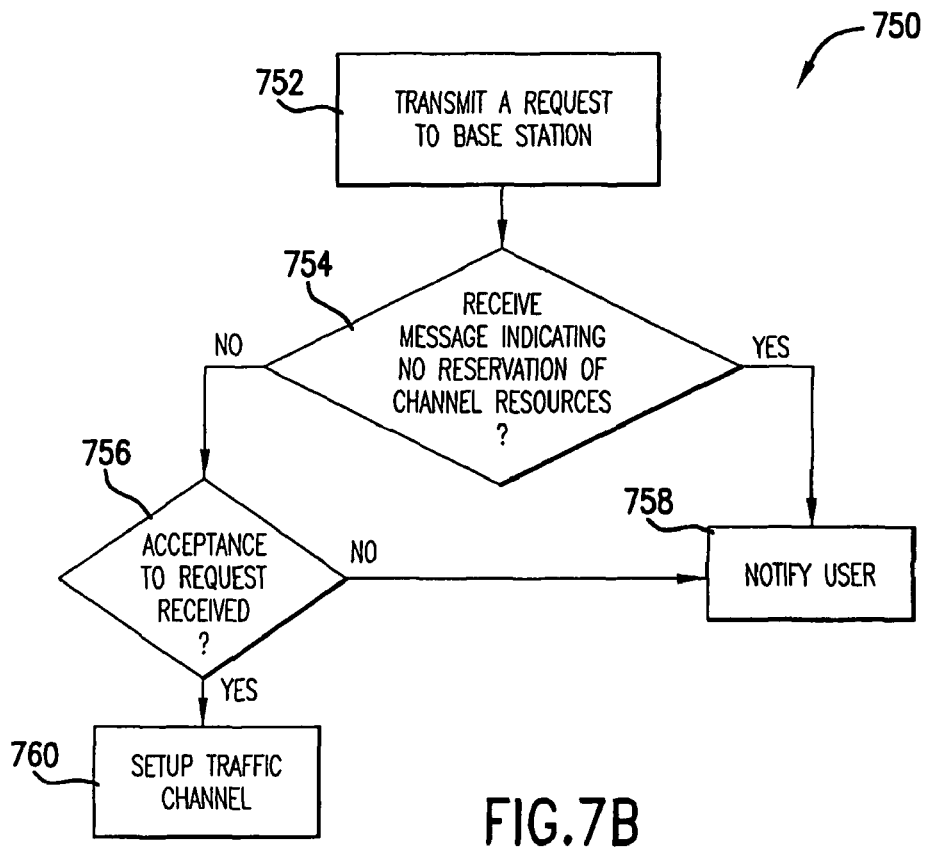
FIG. 7B illustrates a flow diagram of an exemplary method implement by the subscriber unit in accordance with another embodiment of the invention.

FIG. 7B illustrates a flow diagram of an exemplary method 750 implemented by the subscriber unit 700 in accordance with another embodiment of the invention. According to the method 750, upon a user activating the input device 710 in order to send a request to communicate with the wireless communications system, the processor 702 transmits a request to the corresponding base station by way of the RF interface 704 (block 752). After transmitting the request, the processor 702 determines whether it has received a notification from the wireless communications system that the originator base station could not reserve channel resources for a traffic channel to communicate with the subscriber unit 700 (block 754).

If the processor 702 determines that it has received the notification indicating that channel resources cannot be reserved, the processor 702 may perform a number of predetermined operations, such as notifying the user via the display 708 or other notification device (block 758). Otherwise, the processor 702 determines whether it has received a message accepting the request (block 756). If the processor 702 receives such a message, the processor 702 communicates with the corresponding base station to setup a traffic channel (block 760). Otherwise, the processor 702 may perform a number of predetermined operations, such as notifying the user via the display 708 or other notification device (758).

While the invention has been described in connection with various embodiments, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

It is claimed:

1. A wireless communications system, comprising:
   a network application server that sets-up communication channels, wherein the network application server is one of a dispatch call processing unit that sets-up communication channels for dispatch communications, an instant messaging processing unit that sets-up communication channels for instant messaging communication or a global positioning satellite (GPS) processing unit that sets-up communications for location information; and
   a base station to:
      receive a request packet from a subscriber unit;
      attempt to reserve channel resources for a traffic channel to communicate with said subscriber unit in response to receipt of the request packet; and
      notify said network application server of whether said channel resources have been reserved by marking the request packet and sending the marked request packet to the network application server.

2. The wireless communications system of claim 1, wherein said base station is adapted to mark the request packet by:
   marking a type of service (TOS) field of said request packet to indicate whether said channel resources have been reserved.

3. The wireless communications system of claim 2, wherein said base station is adapted to receive said request packet from said subscriber unit by way of a wireless medium.

4. The wireless communications system of claim 3, wherein said base station is adapted to receive said request packet from said subscriber unit using a common channel.

5. The wireless communications system of claim 2, wherein said base station is adapted to send said marked request packet to said network application server by way of a network.

6. The wireless communications system of claim 2, wherein said network application server performs a first operation if said marked request packet indicates that said channel resources have been reserved, and performs a second operation if said marked request packet indicates that said channel resources have not been reserved.

7. The wireless communications system of claim 6, wherein said first operation is different than said second operation.

8. A method comprising:
   receiving, by a base station, a request packet from a subscriber unit, wherein the request packet is a request to a network application server for one of a dispatch communication, an instant messaging communication or a location information communication;
   attempting, by the base station, to reserve channel resources for a traffic channel to communicate with said subscriber unit in response to receipt of the request packet; and
   notifying, by the base station, said network application server of whether said channel resources have been reserved by marking the request packet and sending the marked request packet to the network application server.

9. The method of claim 8, wherein marking the request packet comprises:
marking a type of service (TOS) field of said request packet to indicate whether said channel resources have been reserved.

10. The method of claim 9, further comprising receiving said request packet from said subscriber unit by way of a wireless medium.

11. The method of claim 10, wherein receiving said request packet from said subscriber unit comprises using a common channel for receiving said request packet.

12. A base station comprising:
a network interface;
a radio frequency [RF] interface; and
a processor to:
receive a request packet from a subscriber unit by way of said RF interface, wherein the request packet is a request for one of a dispatch communication, an instant messaging communication, a database communication or a location information communication;
attempt to reserve channel resources for a traffic channel to communicate with said subscriber unit; and
send a notification to a network application server by way of said network interface indicating whether said channel resources have been reserved, wherein said processor generates said notification by marking a type of service (TOS) field of said request packet to indicate whether said channel resources have been reserved.

13. A computer readable medium encoded with a computer program, said computer program, when executed, performs the following functions:
receive an initial request packet from a subscriber unit by way of a radio frequency (RF) interface, wherein the initial request packet is a request to a network application server for one of a dispatch communication, an instant messaging communication or a location information communication;
attempt to reserve channel resources for a traffic channel to communicate with said subscriber unit, in response to receipt of the initial request packet and prior to notifying a network application server of whether said channel resources have been reserved; and
notify the network application server of whether said channel resources have been reserved by marking the request packet and sending the marked request packet to the network application server.

14. The computer readable medium of claim 13, wherein marking the request packet involves said one or more software module to control said processor to notify said network application server by:
marking a type of service (TOS) field of said request packet to indicate whether said channel resources have been reserved.

* * * * *